United States Patent [19]

Huelsman et al.

[11] Patent Number: 5,581,905
[45] Date of Patent: Dec. 10, 1996

[54] COATED SUBSTRATE DRYING SYSTEM

[75] Inventors: Gary L. Huelsman; William B. Kolb, both of St. Paul, Minn.

[73] Assignee: Minnesota Mining and Manufacturing Company, St. Paul, Minn.

[21] Appl. No.: 536,593

[22] Filed: Sep. 18, 1995

[51] Int. Cl.[6] ........................... F26B 7/00
[52] U.S. Cl. ................ 34/421; 34/463; 34/469; 34/73
[58] Field of Search .................... 34/73, 76–77, 34/468–69, 421–22, 463; 165/110, 913

[56] References Cited

U.S. PATENT DOCUMENTS

| | | | |
|---|---|---|---|
| 1,494,830 | 5/1924 | Cook | 34/77 |
| 4,321,757 | 3/1982 | van der Blom | 34/449 |
| 4,365,423 | 12/1982 | Arter et al. | 34/463 |
| 4,389,797 | 6/1983 | Spigarelli et al. | 34/73 |
| 4,413,425 | 11/1983 | Candor | 34/251 |
| 4,467,788 | 8/1984 | Peranio | 126/433 |
| 4,894,927 | 1/1990 | Ogawa et al. | 34/507 |
| 4,951,401 | 8/1990 | Suzuki et al. | 34/77 |
| 4,999,927 | 3/1991 | Durst et al. | 34/448 |
| 5,448,838 | 9/1995 | Edmonds | 34/73 |

FOREIGN PATENT DOCUMENTS

| | | |
|---|---|---|
| 4009797A1 | 10/1991 | Germany. |
| 1401041 | 9/1975 | United Kingdom. |

OTHER PUBLICATIONS

Lopez de Ramos, A. L., "Capillary Enhanced Diffusion of $CO_2$ in Porous Media," Ph.D. Thesis, University of Tulsa (1993).

*Primary Examiner*—John M. Sollecito
*Assistant Examiner*—Steve Gravini
*Attorney, Agent, or Firm*—Gary L. Griswold; Walter N. Kirn; Charles D. Levine

[57] ABSTRACT

A method and apparatus of drying a substrate uses a condensing surface located within 15 cm of the substrate on the side of the substrate being dried. The liquid from the substrate is evaporated and then condensed on the condensing surface without applied convection. The condensed liquid is removed from the condensing surface while the condensed liquid remains liquid. Evaporation can be performed by heating the substrate without applied convection.

41 Claims, 3 Drawing Sheets

COATED SUBSTRATE DRYING SYSTEM

TECHNICAL FIELD

The present invention relates to a method and apparatus for drying liquid coatings on a substrate. More particularly, the present invention relates to drying webs in enclosed areas.

BACKGROUND OF THE INVENTION

Drying coated substrates, such as webs, requires heating the coating and then removing the evaporated liquid. Convection, conduction, and radiation are used to heat coated webs. Applied convection or forced gas flow is used to remove the evaporated liquid. Applied convection is defined as convection produced by the input of power and caused intentionally. It excludes convection caused merely by web movement, natural convection, and similar, unintentional forces. In some instances where the vapors are non-toxic, such as water evaporation, the vapor is removed by flashing off into the ambient atmosphere.

In conventional drying technology, large volumes of gas, inert or not, are required to remove evaporated liquid from the gas/liquid interface. These dryers require large gaps between the coated web being dried and the top of the drying enclosure to accommodate the large gas flows. Drying is governed at the gas/liquid interface by diffusion, boundary layer air from the moving web, vapor concentrations, and liquid to vapor change-of-state convection, among other factors. These phenomena occur immediately above the coated web, typically within 15 cm of the surface. Because conventional dryers have a large gap above the coated web, and they can only control the average velocity and temperature of the bulk gas stream, they have limited ability to control these phenomena near the gas/liquid interface.

The vapor concentrations in these bulk gas streams is kept low, typically 1–2%, to remain below the flammable limits for the vapor/gas mixture. These large gas flows are intended to remove the evaporated liquid from the process. The expense to enclose, heat, pressurize, and control these gas flows is a major part of the dryer cost. It would be advantageous to eliminate the need for these large gas flows.

These gas streams can be directed to condensation systems to separate the vapors before exhausting, using large heat exchangers or chilled rolls with wiping blades. These condensation systems are located relatively far from the coated web in the bulk gas flow stream. Due to the low vapor concentration in this gas stream, these systems are large, expensive, and must operate at low temperatures.

It would be advantageous to locate the condensation systems close to the coated substrate where the vapor concentrations are high. However, conventional heat exchangers would drain the condensed liquid by gravity back onto the web surface and affect product quality unless they were tilted or had a collection pan. If they had a collection pan they would be isolated from the high concentration web surface. If they were tilted dripping would probably still be a problem. Also, conventional heat exchangers are not planar to follow the web path and control the drying conditions.

U.S. Pat. No. 4,365,423 describes a drying system which uses a foraminous surface above the web being dried to shield the coating from turbulence produced by the large gas flows to prevent mottle. However, this system does not eliminate applied convection, requires using secondary, low efficiency solvent recovery, and has reduced drying rates. Also, because of the reduced drying rates, this patent teaches using this shield for only 5–25% of the dryer length.

German Offenlegungeschrift No. 4009797 describes a solvent recovery system located within a drying enclosure to remove evaporated liquid. A chilled roll with a scraping blade is placed above the web surface and removes the vapors in liquid form. No applied convection removes the evaporated liquid. However, the roll is only in the high vapor concentration near the surface for a short section of the dryer length. This does not provide optimal control of the conditions at the gas/liquid interface. In fact as the roll rotates it can create turbulence near the web surface. Also, this system can not adapt its shape to the series of planar surfaces of the coated web as it travels through the dryer. Therefore, the system can not operate with a small, planar gap to control drying conditions and can not achieve optimum condensing efficiency.

There is a need for a system for drying coated substrates which provides improved control of the conditions near the gas/liquid interface, which eliminates the need for applied convection to remove the evaporated liquid, and which improves the efficiency of the condensation vapor recovery systems.

SUMMARY OF THE INVENTION

The invention is a method and apparatus of drying a coated substrate. A condensing surface is located within 15 cm of the substrate on the side of the substrate being dried (the side with the coating). The liquid from the coated substrate is evaporated and is then condensed on the condensing surface without applied convection. The condensed liquid is removed from the condensing surface while it remains liquid.

Evaporation can be performed by heating the substrate without applied convection. The substrate can move relative to the apparatus. Removing the condensed liquid can inherently recover the liquid removed from the coated substrate.

The condensing surface can have a length of less than 2 m and can satisfy the Concus-Finn Inequality. An edge plate which contacts the condensing surface can remove the condensed liquid from the condensing surface after the liquid travels to the edge plate.

The condensing surface can be part of a condensing plate and can form a small gap above the substrate. A heating plate can also be used. The plates can include passageways for receiving a heat transfer fluid.

DETAILED DESCRIPTION

Figure 1:
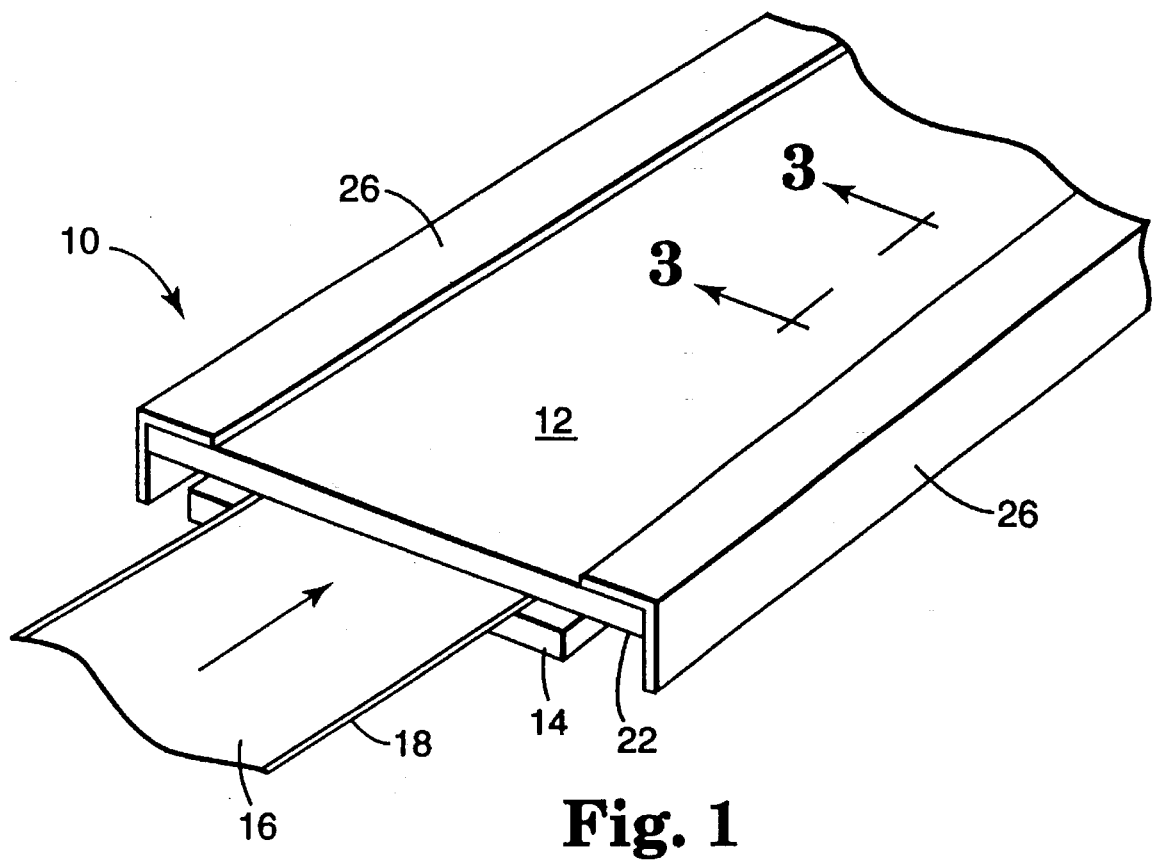
FIG. 1 is a perspective view of the drying apparatus of the invention.
Figure 2:
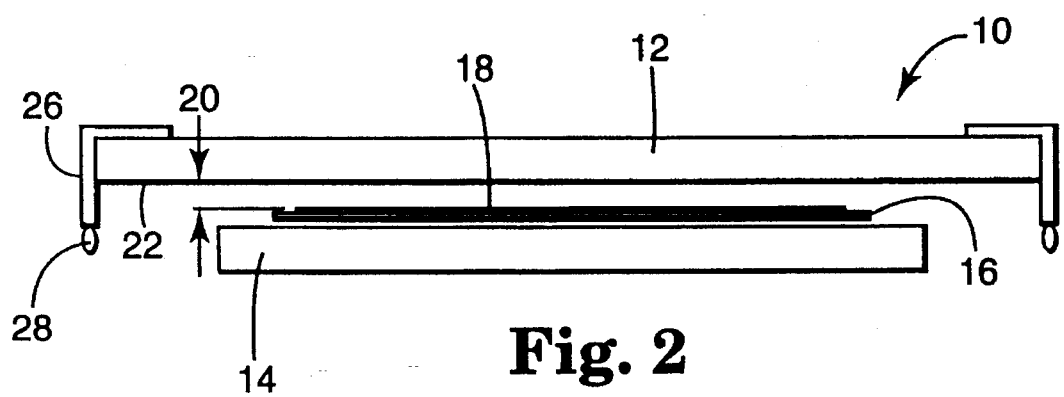
FIG. 2 is a cross-sectional view of the drying apparatus of FIG. 1.
Figure 3:
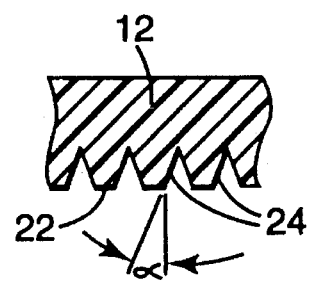
FIG. 3 is a cross-sectional view taken along line 3—3 of FIG. 1.
Figure 4:
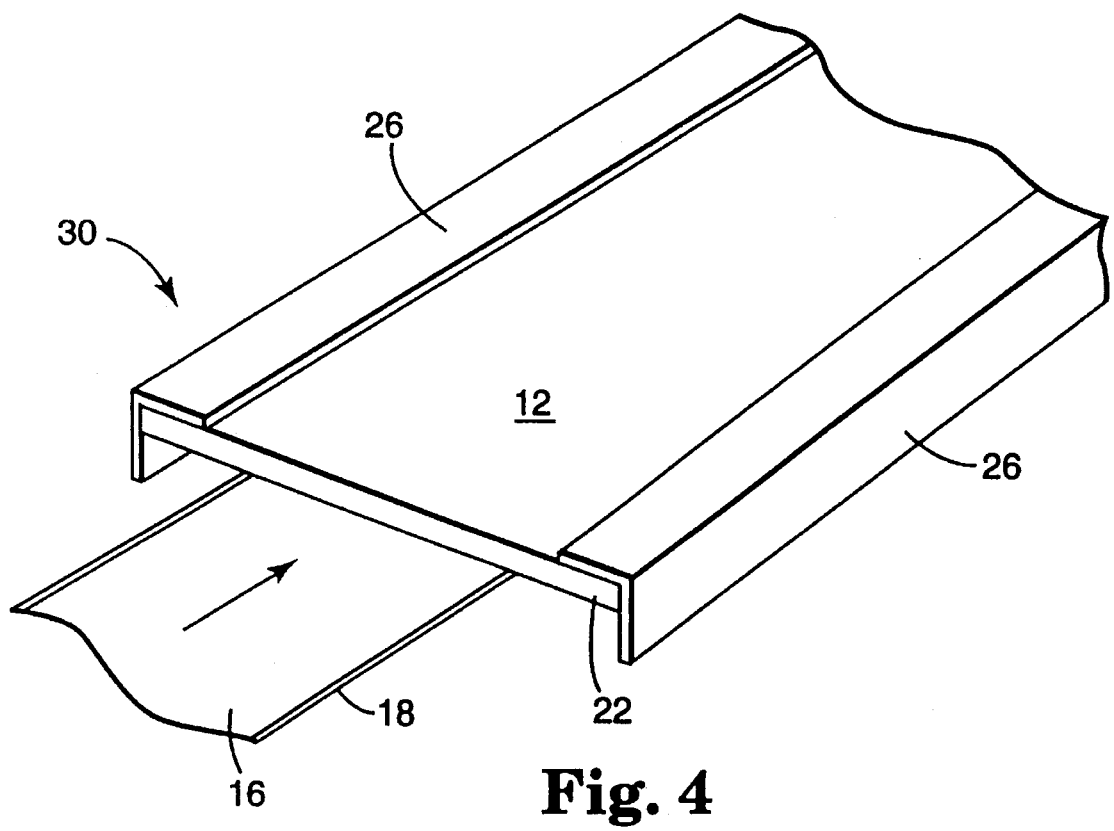
FIG. 4 is a perspective view of the drying apparatus according to another embodiment of the invention.
Figure 5:
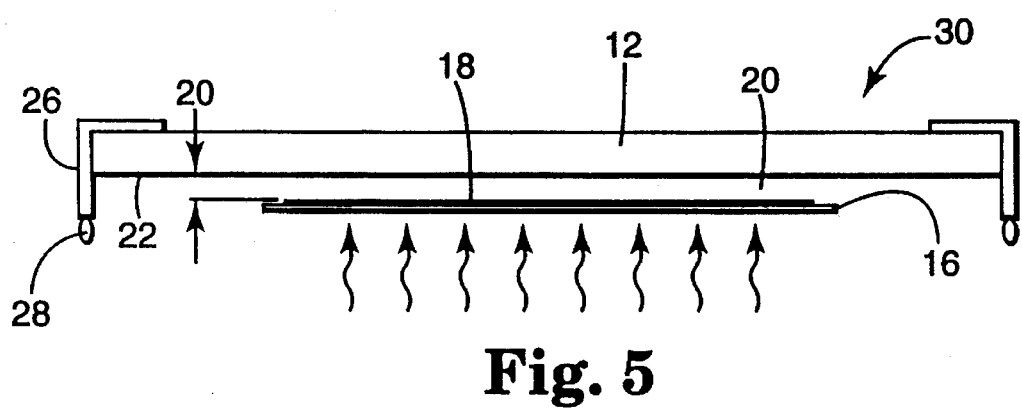
FIG. 5 is a cross-sectional view of the drying apparatus of FIG. 4.

The system of this invention is a method and apparatus for drying coatings on a coated substrate, such as a moving web, with a condensing surface creating a small, controlled-environment gap above the coating surface. In the embodiment of FIGS. 1, 2, and 3, drying (both heating the liquid to evaporate it and removing the evaporated liquid from the web) occurs without requiring the applied gas convection associated with conventional drying methods. This reduces mottle formation associated with many precision coatings and enables drying at increased drying rates. In the embodiment of FIGS. 4 and 5, at least the removal of the evaporated liquid from the web occurs without applied gas convection. Both versions of this system attain improved control of the phenomena occurring near the gas/liquid interface and attain high liquid recovery efficiencies.

Both versions use condensation to dry webs in a substantially planar gap without applied convection forces, and where ambient, boundary layer, and change-of-state convection forces are minimized. The drying system has numerous advantages over the conventional drying technology by creating a small, controlled-environment gap above the coating surface, and by eliminating applied convection from the drying mechanism.

Any kind of condensing structure can be used, such as plates of any type, whether flat or not. Plates, as described in this application, include fixed or moving platens, moving belts with or without liquid scrapers, and similar devices. FIGS. 1, 2, and 3 show an apparatus using two platens. FIGS. 4 and 5 show an apparatus using one platen. In both versions, one platen has a condensing, liquid-removal surface located a short distance from the coating surface of the web. Distances of less than 15–20 cm are preferred.

In FIGS. 1 and 2, the apparatus 10 includes a condensing platen 12, which can be chilled, spaced from a heated platen 14. The web 16, having a coating 18, travels at any speed between the two platens. Alternatively, the web can be stationary and the entire apparatus 10 moves or both the web and apparatus move. The platens are stationary within the apparatus. The heated platen 14 is located on the non-coated side of the web 16, either in contact with the web or with a small air gap between the web and the platen. The condensing platen 12 is located on the coated side of the web 16. The heated platen 14 eliminates applied convection forces both above and below the web 16o The condensing platen 12, which can be stationary or mobile, is placed above but near the coated surface (such as 10 cm away, 5 cm away, or closer). The arrangement of the platens creates a small, substantially planar gap above the coated web. The orientation of the platens is not critical. The condensing platen 12 can be above the web, below the web (with the coating on the bottom surface of the web), and the system can operate with the web vertical or at any other angle.

The heated platen 14 transfers heat without convection through the web 16 to the coating 18 to evaporate liquid from the coating 18 to dry the coating. Heat is transferred by conduction or radiation, achieving high heat transfer rates. This evaporates the liquid in the coating 18 on the web 16. The evaporated liquid from the coating 18 then travels across the gap 20 between the web 16 and the condensing platen 12 and condenses on the bottom surface of the condensing platen 12.

As shown in FIG. 3, the bottom surface of the condensing platen 12 is the condensing surface 22 and has transverse open channels or grooves 24 which use capillary forces to move the condensed liquid laterally to edge plates 26. The grooves 24 also can be longitudinal or in any other direction. Alternatively, other mechanisms can be used to move the condensed liquid from the surface 22 of the condensing platen 12 to prevent the condensed liquid from returning to the web 16. For example, mechanical devices, such as wipers, belts, or scrapers, or any combination, can be used instead of platens to remove the condensed liquid. Fins on the condensing surface 22 also can be used. In other embodiments, the condensing surface 22 can be tilted to use gravity to flow the liquid, or a capillary surface could be used to force or pump the liquid to a higher elevation before or instead of using gravity. Also, forming the condensing surface (or the grooves 24) as a capillary surface will remove the condensed liquid. A capillary surface is defined as a geometrically specific surface which satisfies the Concus-Finn Inequality which is: $\alpha + \theta_s < 90°$, where $\alpha$ is half the included angle of any corner and $\theta_s$ is the gas/liquid/solid static contact angle. The static contact angle is governed by the surface tension of the liquid for a given surface material in gas. Capillary surfaces are discussed in great detail in Lopez de Ramos, A. L., "Capillary Enhanced Diffusion of $CO_2$ in Porous Media," Ph.D. Thesis, University of Tulsa (1993).

When the liquid reaches the end of the grooves 24 it intersects with the angle between the edge plates 26 and the condensing surface 22. Liquid collects at this interface and gravity overcomes the capillary force and the liquid flows as a film or droplets 28 down the face of the edge plates 26, which can have capillary surfaces. The edge plates 26 can be used with any condensing surface, not just one having grooves. The droplets 28 fall from each edge plate 26 and can be collected in a collecting device (not shown). For example, a slotted pipe can be placed around the bottom edge of each edge plate 26 to collect the liquid and direct it to a container. Alternatively, the condensed liquid need not be removed from the platen at all, as long as it is removed from the condensing surface 22, or at least prevented from returning to the web 16. Also, the edge plates 26 are shown as perpendicular to the condensing surface 14, although they can be at other angles with it, and the edge plates 26 can be smooth, capillary surfaces, porous media, or other surfaces.

The heated platen 14 and the condensing platen 12 can include internal passageways, such as channels. A heat transfer fluid can be heated by an external heating system and circulated through the passageways in the heated platen 14. The same or a different heat transfer fluid can be cooled by an external chiller and circulated through the passageways in the condensing platen 12. Other mechanisms for heating the platen 14 and cooling the platen 12 can be used.

The apparatus 30 of FIGS. 4 and 5 is similar to that of FIGS. 1–3 except there is no heating platen. In the apparatus 30, the web 16 is heated to evaporate the liquid from the coating by any heating method, whether conduction, radiation, or convection, using any type of heater. This system is used where convection-induced defects, such as mottle, are not a concern. This system can even operate without any applied heat, even outside the dryer, using only ambient heat to evaporate the liquid. The apparatus 30 otherwise operates the same as that of FIGS. 1–3, without using applied convection removal of the evaporated liquid from the web 16 to the condensing surface 22 on the condensing platen 12. The gap 20 between the coated web 16 and the condensing surface 22 is isolated from the heating devices by any combination of the web 16 and web supports or other barriers. This isolates this area from any applied convection.

The systems of both embodiments use condensation close to the coated web 16 with a small gap between the coating on the web 16 and the condensing surface 22 to evaporate liquid. There is no applied convection and very little vapor volume. The vapor concentration and convection forces can be controlled by adjusting the web temperature, the gap, and the condensing surface temperature. This provides improved control of the boundary layer effects and phase change conditions near the gas/liquid interface, which improves drying. It also improves the efficiency of the condensation vapor recovery systems, providing for liquid recovery at high efficiencies at no additional cost compared to known expensive methods of burning, adsorption, or condensation in a secondary gas stream.

Also, the web can travel at higher speeds and there is less of a concern about the ambient air above the web exploding or being above the flammability limit. In fact, where the gap is very small, such as less than 1 cm, flammability concerns may be eliminated because the entire space above the web has insufficient oxygen to support flammability. Additionally, this system eliminates the need for large gas flows. The mechanical equipment and control system is only 20% of the cost of a conventional air flotation drying system.

Figure 6:
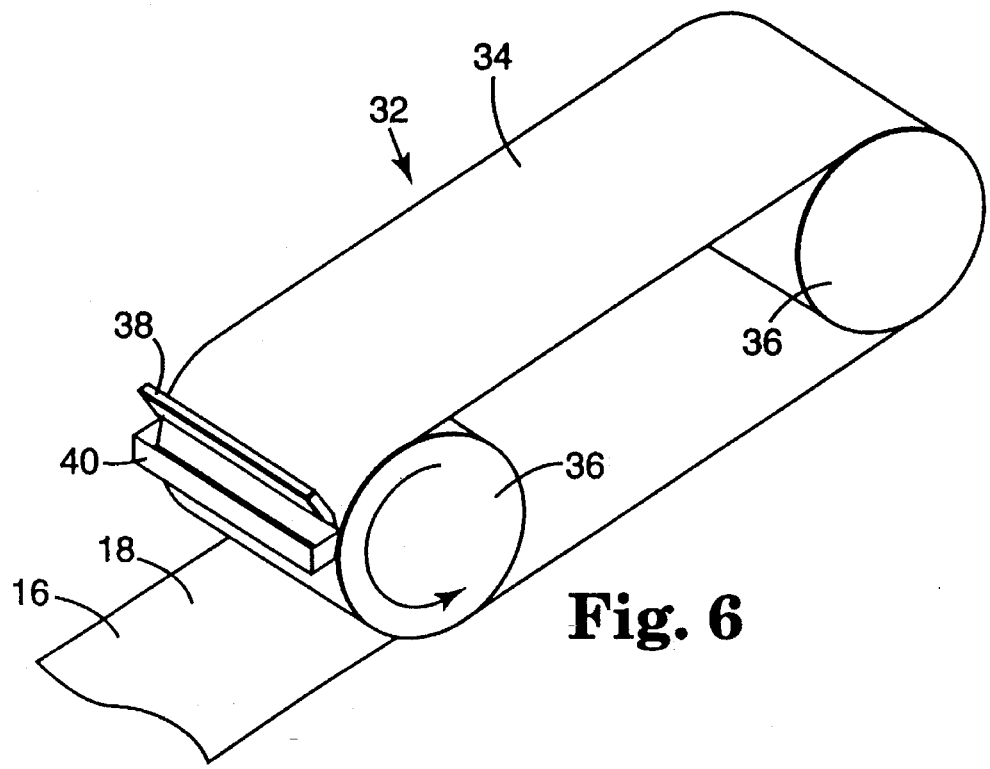
FIG. 6 is a perspective view of the drying apparatus according to another embodiment of the invention.

In alternative embodiments, the condensing surface 22 is located on a moving belt. As shown in FIG. 6, a belt 34 can rotate around a pair of rollers 36. The belt 34 can move slower, faster, or at the same speed as the web 16. The condensing surface 22 is on the outer surface of the belt 34. Condensed liquid can be removed from the belt 34 by a scraper 38, which scrapes the liquid into a container 40.

Figure 7:
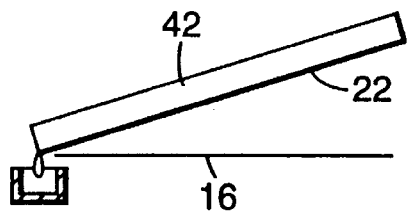
FIG. 7 is a cross-sectional view of the drying apparatus according to another embodiment of the invention.
Figure 8:
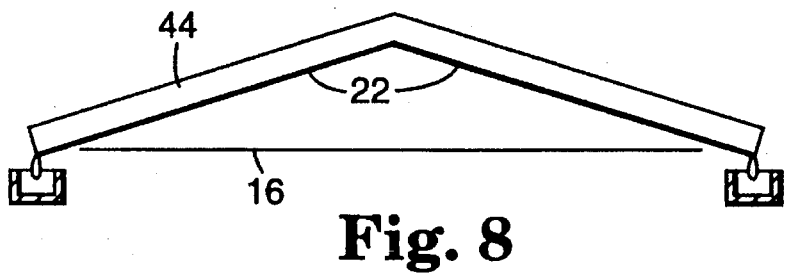
FIG. 8 is a cross-sectional view of the drying apparatus according to another embodiment of the invention.
Figure 9:
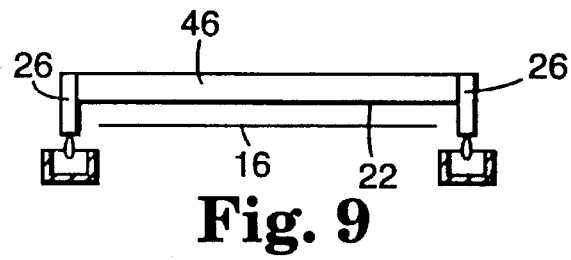
FIG. 9 is a cross-sectional view of the drying apparatus according to another embodiment of the invention.

In FIGS. 7, 8, and 9, smooth, non-capillary surfaces are used as the condensing surface. In FIG. 7, the plate 42 is tilted to one transverse side of the web 16 to use gravity to remove the condensed liquid from the condensing surface 22 on the plate. In FIG. 8, the plate 44 is angled to use gravity to remove the condensed liquid to both sides of the web 16. The angle could be centered on the longitudinal centerline of the web or it can be off-center. In FIG. 9, the plate 46 is substantially horizontal and is smooth. The edge plates 26 have capillary surfaces which forces the condensed liquid from the condensing surface on the plate 46.

Drying some coated webs using convection can create mottle patterns in the coatings. Mottle patterns are defects in film coatings that are formed by vapor concentration or gas velocity gradients above the coating which cause non-uniform drying at the liquid surface. Normal room air currents are often sufficient to create these defects.

Experiments were conducted with 30.5 cm wide platens having transverse grooves. The bottom platen is heated to temperatures in the range of 37° C. through 135° C. with a heat transfer fluid circulated through passageways in the platens. As the heat is transferred to the coating, the liquid in the coating evaporates. The temperature of the condensing platen is controlled by any suitable method in the range of −18° C. through 150° C. to condense the vapor at the concentrations existing in the gap between the web and the condensing platen 12. An effective range of the gap 20 is 0.15–5 cm. Mottle-free coatings were obtained.

In one example, a mottle-prone polymer/MEK solution at 11.5% solids, 2 centipoise, 7.6 micron wet thickness, and 20.3 cm wide was coated. The web was 21.6 cm wide and traveled at a speed of 0.635 m/s. The temperature of the heated platen used to heat the web was controlled at 82° C. The condensing platen temperature was controlled at 27° C. The overall length of the platens was 1.68 m and they were mounted at a 3.4° angle from horizontal with the inlet side at a lower elevation. The inlet to the platens was located 76 cm from the coating application point. The heated platen was separated from the web by a gap of approximately 0.076 cm. The gap 20 was set at 0.32 cm. The capillary grooves were 0.0381 cm deep with a 0.076 cm peak-to-peak distance, an angle $\alpha$ of 30°, and 0.013 cm land at the top and bottom of the grooves. The web was dried mottle-free in the 1.68 m length of the platens although there was some residual solvent in the coating when it left the platens. A conventional dryer would require approximately 9 m to reach the same drying point, requiring the dryer to be more than five times larger.

Other applications for this system include drying adhesives where blister defects are common. Blister defects are caused by the surface forming a dried skin before the rest of the coating has dried, trapping solvent below this skin. With conventional drying, the solvent vapor concentration is very low because of flammability limits. If too much heat is applied to the coating, the solvent at the surface will flash very quickly into the low vapor concentration gas stream and will form the skin on the surface. The system of this invention creates a controlled vapor concentration in the space above the web which can inhibit flashing off of the solvent to reduce the tendency to form a skin on the surface. Other applications are in areas where dryers are run at high solvent concentrations to obtain specific product performance.

We claim:

1. A method of drying a coated substrate comprising:

locating a condensing surface above the substrate which substantially corresponds to the path of the substrate in the longitudinal direction to create a substantially constant longitudinal gap between the substrate and the condensing surface;

evaporating the liquid from the substrate to create a vapor;

condensing the vapor on the condensing surface to create a condensate; and removing the condensate from the condensing surface while the condensate remains in the liquid state.

2. The method of claim 1 wherein the evaporating step comprises applying energy to the substrate without applied convection.

3. The method of claim 2 wherein the evaporating step comprises applying energy to the substrate using a heating surface on the side of the substrate opposite the condensing surface.

4. The method of claim 1 wherein the removing the condensate step comprises tilting the condensing surface toward a side of the substrate.

5. The method of claim 1 further comprising the step of moving the substrate.

6. The method of claim 1 further comprising the step of recovering and collecting the condensate removed from the substrate.

7. The method of claim 1 wherein the evaporating the liquid step comprises evaporating the liquid using at least one of conduction, convection, and radiation.

8. An apparatus for drying a coated substrate comprising:

a condensing surface spaced above the substrate which corresponds to the path of the substrate in the longitudinal direction to create a substantially constant longitudinal gap between the substrate and the condensing surface;

means for evaporating the liquid from the substrate to create a vapor;

means for condensing the vapor on the condensing surface to create a condensate; and means for removing the condensate from the condensing surface.

9. The apparatus of claim 8 wherein the means for evaporating the liquid from the substrate comprises means for supplying energy to the substrate without applied convection.

10. The apparatus of claim 8 further comprising means for moving the substrate relative to the condensing surface.

11. An apparatus for drying a coated substrate comprising:

a condensing surface spaced within 15 cm of the substrate which corresponds to the path of the substrate in the longitudinal direction to create a substantially constant gap between the substrate and the condensing surface, wherein the condensing surface is a capillary surface that satisfies the Concus-Finn Inequality;

means for evaporating the liquid from the substrate to create a vapor;

means for condensing the vapor on the condensing surface without applied convection to create a condensate; and means for removing the condensate from the condensing surface while the condensate remains in the liquid state.

12. The apparatus of claim 11 wherein the removing the condensate means comprises at least one edge plate contacting the condensing surface.

13. The apparatus of claim 12 wherein the condensing surface comprises open grooves for moving the condensate along the condensing surface to the edge plate.

14. The apparatus of claim 8 further comprising a condensing plate located on the side of the substrate being dried wherein the condensing surface is part of the condensing plate, and a heated plate located on the side of the substrate not being dried, wherein the evaporating means is part of the heated plate.

15. The apparatus of claim 14 wherein the condensing plate comprises passageways for receiving a heat transfer fluid and wherein the heated plate comprises passageways for receiving a heat transfer fluid.

16. A method for drying a coated on a first substrate surface of a substrate, comprising the steps of:

locating a condensing surface adjacent to the substrate to create a gap between the substrate and the condensing surface, the condensing surface having at least one condensing surface side edge;

evaporating a liquid within the coating to create a vapor;

condensing the vapor on the condensing surface to create a condensate; and removing the condensate from the condensing surface by moving the condensate toward the at least one condensing surface side edge.

17. The method of claim 16 wherein the removing step comprises removing the condensate from the condensing surface by moving the condensate to the at least one condensing surface side edge.

18. The method of claim 16 wherein the removing step comprises removing the condensate from the condensing surface by removing the condensate before it reaches the at least one condensing surface side edge.

19. The method of claim 16 wherein the removing step comprises removing the condensate from the condensing surface by moving the condensate in a substantially transverse direction to the direction of the relative motion between the substrate and the condensing surface.

20. The method of claim 16 wherein the locating step comprises creating a substantially constant gap.

21. The method of claim 16 wherein the locating step comprises locating the condensing surface within 15 cm of the substrate.

22. The method of claim 16 wherein the locating step comprises locating the condensing surface adjacent to the first substrate surface, and further comprising the step of transporting the substrate adjacent to the condensing surface.

23. The method of claim 16 wherein the evaporating step comprises evaporating liquid without applying convection to the liquid.

24. The method of claim 16 wherein the first substrate surface is oriented upwardly and adjacent to the condensing surface, wherein the substrate creates a substantially horizontal plane when the first substrate surface is adjacent to a first portion of the condensing surface.

25. The method of claim 16 wherein the substrate also has a second substrate surface, and wherein the evaporating step comprises heating the substrate primarily on the second substrate surface with at least one of conduction, convection, and radiation.

26. The method of claim 16 wherein the locating step comprises locating a condensing surface that has a surface form which creates sufficient capillarity to cause the condensate to move toward the at least one condensing surface side.

27. The method of claim 16 further comprising the step of locating an edge member adjacent to the at least one condensing surface side to create sufficient capillarity to move the condensate along the edge member.

28. An apparatus for drying a coating on a first substrate surface of a substrate, comprising:

a condensing surface locatable relative to the substrate to create a gap between the substrate and the condensing surface, where the condensing surface has at least one condensing surface side edge;

means for evaporating liquid within the coating to create a vapor;

means for condensing the vapor on the condensing surface to a condensate; and means for removing the condensate from the condensing surface by moving the condensate toward the at least one condensing surface side edge.

29. The apparatus of claim 28 wherein the means for removing comprises means for removing the condensate from the condensing surface by moving the condensate to the at least one condensing surface side edge.

30. The apparatus of claim 28 wherein the means for removing comprises means for removing the condensate from the condensing surface by removing the condensate before it reaches the at least one condensing surface side edge.

31. The apparatus of claim 28 wherein the means for removing comprises means for removing the condensate from the condensing surface by moving the condensate in a substantially transverse direction to the direction of the relative motion between the substrate and the condensing surface.

32. The apparatus of claim 28 wherein the condensing surface is located relative to the substrate to create a substantially constant gap.

33. The apparatus of claim 28 wherein the condensing surface is located within 15 cm of the substrate.

34. The apparatus of claim 28 wherein the condensing surface is located adjacent to the first substrate surface, and further comprising means for transporting the substrate adjacent to the condensing surface.

35. The apparatus of claim 28 wherein the means for evaporating comprises means for evaporating liquid without applying convection to the liquid.

36. The apparatus of claim 28 wherein the first substrate surface is oriented upwardly and adjacent to the condensing surface, wherein the substrate creates a substantially horizontal plane when the first substrate surface is adjacent to a first portion of the condensing surface.

37. The apparatus of claim 28 wherein the substrate also has a second substrate surface, and wherein the evaporating step comprises heating the substrate primarily on the second substrate surface with at least one of conduction, convection, and radiation.

38. The apparatus of claim 28 wherein the condensing surface has a surface form which creates sufficient capillarity to cause the condensate to move toward the at least one condensing surface side.

39. The apparatus of claim 28 further comprising an edge member located adjacent to the at least one condensing surface side to create sufficient capillarity to move the condensate along the edge member.

40. A method for drying a coated on a first substrate surface of a substrate, comprising the steps of:

locating a condensing surface adjacent to the substrate to create a gap between the substrate and the condensing surface, wherein the first substrate surface is orientable upwardly and adjacent to the condensing surface which is orientable downwardly;

evaporating a liquid within the coating to create a vapor;

condensing the vapor on the condensing surface to a condensate; and removing the condensate from the condensing surface while preventing the condensate from bridging from the condensing surface to the substrate.

41. An apparatus for drying a coated on a first substrate surface of a substrate, comprising:

a condensing surface located adjacent to the substrate to create a gap between the substrate and the condensing surface, wherein the first substrate surface is orientable upwardly and adjacent to the condensing surface which is orientable downwardly;

means for evaporating a liquid within the coating to create a vapor;

means for condensing the vapor on the condensing surface to a condensate; and means for removing the condensate from the condensing surface and for preventing the condensate from bridging from the condensing surface to the substrate.

* * * * *